United States Patent [19]

McSwain

[11] 3,844,311

[45] Oct. 29, 1974

[54] VALVE CONTROL APPARATUS

[76] Inventor: Horace C. McSwain, 703 Westwood, Richardson, Tex. 75080

[22] Filed: Nov. 10, 1972

[21] Appl. No.: 305,295

[52] U.S. Cl. .................................... 137/624.11
[51] Int. Cl. ................................. F16k 21/06
[58] Field of Search..... 137/624.11, 624.12, 624.22; 251/46, 45, 44, 33; 74/3.54, 3.56

[56] References Cited
UNITED STATES PATENTS

| 631,025 | 8/1899 | Merrill | 137/624.22 |
| 927,706 | 7/1909 | Beardsley | 137/624.22 X |
| 1,302,538 | 5/1919 | Gulick | 137/413 |
| 2,573,369 | 10/1951 | Snoddy | 251/46 X |
| 2,933,257 | 4/1960 | Clark | 251/46 X |
| 3,275,022 | 9/1966 | Kobayashi et al. | 251/43 X |
| 3,367,621 | 2/1968 | Griswold | 251/46 X |
| 3,410,301 | 11/1968 | Merriner | 137/624.11 X |
| 3,426,789 | 2/1969 | Connealy | 251/46 X |
| 3,459,403 | 8/1969 | Royer | 251/46 X |

Primary Examiner—Henry T. Klinksiek
Attorney, Agent, or Firm—Clegg, Cantrell & Crisman

[57] ABSTRACT

Disclosed is a mechanical timing and control apparatus for automatic valves. The timer and control regulate fluid flow in the control channel of an automatic valve by operating against incoming fluid.

4 Claims, 5 Drawing Figures

VALVE CONTROL APPARATUS

This invention relates to apparatus for timing and controlling fluid flow. More particularly it relates to semi-automatic mechanical control means for regulating fluid flow through a pressure control channel. By regulating this fluid flow, a pressure is generated which controls fluid flow in the primary artery or channel of a conventional automatic valve. The term automatic valve is used herein to describe any of the general class of valves controlled by pressure differentials between two chambers or channels within the valve.

Automatic valves are commonly used to regulate fluid flow. For instance they are widely applied in watering systems for grounds such as golf courses, parks and the like. The valves can be operated remotely and can be set and timed for automatic turn-on and cut-off.

The typical valve connects into a fluid or water pipe and is buried underground. Such a valve operates on the principle of fluid pressure differential between two isolated channels within the valve. One channel is the primary flow path and conveys almost all the fluid. The other channel conveys usually negligible amounts of fluid but provides the source of pressure differential needed to operate the valve. In the basic valve the two channels are separated by a flexible diaphragm. Water flow through the primary channel is normally cut off by an internal blocking float which is forced against a seat and blocks fluid flow through the primary channel when fluid flow in the control channel is blocked by a moveable plunger or gating piston which closes the path by sealing a fluid exit port. The resultant equal water pressures on opposite sides of the diaphragm allow a spring in the control channel to transmit a force through the diaphragm which seats the float in the primary channel.

Turn-on is achieved by moving the gating piston to unblock the control channel. Pressure then decreases in the control channel and allows the greater pressure in the primary channel to force the blocking float off its seat and into the flexible diaphragm. With the float unseated, fluid flows through the primary channel.

Usually the moveable piston is controlled by electric solenoid means acting against a piston return spring. In conventional installations, all components, including the automatic valve, the solenoid and electric cables are buried underground. Many fluids, especially water, contain small solid particles which accumulate in the control channel of the automatic valve and especially around drain openings or exit paths. These collected particles foul the piston, control channel and exhaust ports; thereby causing cut-off failures. In addition, underground control cables can break and the underground environmental condition can cause control cable deterioration and failure. Locating and repairing any of the above failures requires considerable excavation. It is evident that not only are the digging and repairing time consuming and costly, but much fluid or water can be wasted due to failure of the valve to cut off. There can also be consequential repair expenses such as when the above described failures occur in a golf course or cemetery watering system. Both the system and the grounds must be repaired.

It should be noted that certain inherent characteristics of the electric solenoid also contribute to the unreliability of the conventional system. A solenoid of practical size limits the size of the spring or spring pressure which can be used to close the control piston. When the valve is employed to convey gritty fluids, greater spring closing pressure or force is highly desirable in order to overcome grit deposits and make the piston seal positively irrespective of sediment.

Briefly, in accordance with the present invention, a mechanical control and timer are coupled to the aforementioned gating piston which in turn either admits or prevents fluid flow through the control channel. The invention also includes a uniquely designed fluid bypass network in which the gating piston acts to make or break the seal in the control channel. A manually operated plunger is coupled to the spring tensioned gating piston by means of an interconnecting lever. A simple cocking device comprising a plunger-mounted gravity-operated and counterbalanced wedge provides piston position retention during device operation. A manually wound timer is coupled to the cocking wedge by a small rod. The fluid bypass network constitutes part of the control channel and provides the point at which the gating piston makes or breaks the control channel seal. The bypass is essentially a flanged disc-like insert which has small internal fluid input and output passages. The bypass is constructed such that the piston works and seals against a fluid input port and not an exhaust port.

In operation the timer is set as desired and the plunger is manually depressed. Through the lever coupling means, plunger depression moves the piston against its spring tension and opens the seal between piston and bypass entrance port. The cocking device automatically retains this piston position. Fluid flows through the control channel thereby causing the requisite pressure differential to open the main valve. When clock time expires, the timer trips the cocking device through the interconnecting rod means and the piston closing spring returns the piston to seal off the control channel fluid flow.

In use the manual timer and plunger are located above ground or preferably at or slightly below ground level in a weather-proof case. Since the automatic valve is normally buried, the gating piston, its housing and other relevant hardware are of appropriate length to interjoin the above and below ground components.

It can be readily seen that by eliminating the need for electrical controls, reliability of automatic valve operation is greatly enhanced. Firstly, the strength of the piston closing spring is no longer dependent on or limited by the restricted capability of a practical and reasonable electric solenoid. Spring tension or strength is limited only by the individual operator ability. As noted earlier this contributes to a positive cut-off. Secondly, elimination of electric control wires eliminates the expense and wasted time associated with repair of defective wires. As a further advantage the fluid seal in the control channel makes or breaks against an input port which does not tend to collect solid particles as does an exit port.

A significant feature of the invention is the obviation of electric control means, thereby greatly enhancing automatic valve reliability. Another unique feature is the novel bypass network wherein the input port, rather than exhaust port, is sealed. Furthermore, the invention may be readily adapted to and integrated with virtually any commercially available automatic valve.

Other features and advantages will become more readily understood from the following detailed description taken in connection with the appended claims and attached drawings in which:

Figure 1:
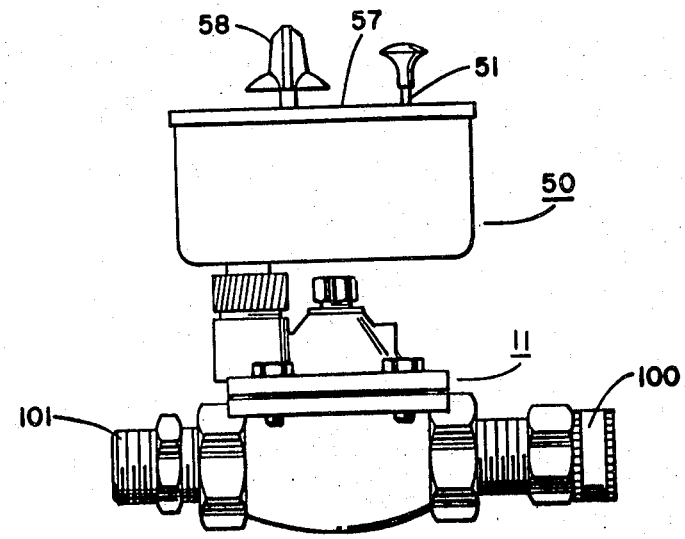
FIG. 1 is an elevational view of the valve timer and control of the invention fitted and joined to a conventional automatic valve.
Figure 2:
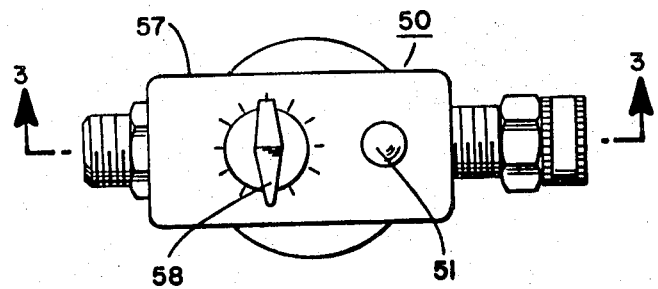
FIG. 2 is a top plan view of the valve timer and control fitted and joined to a conventional automatic valve.
Figure 3:
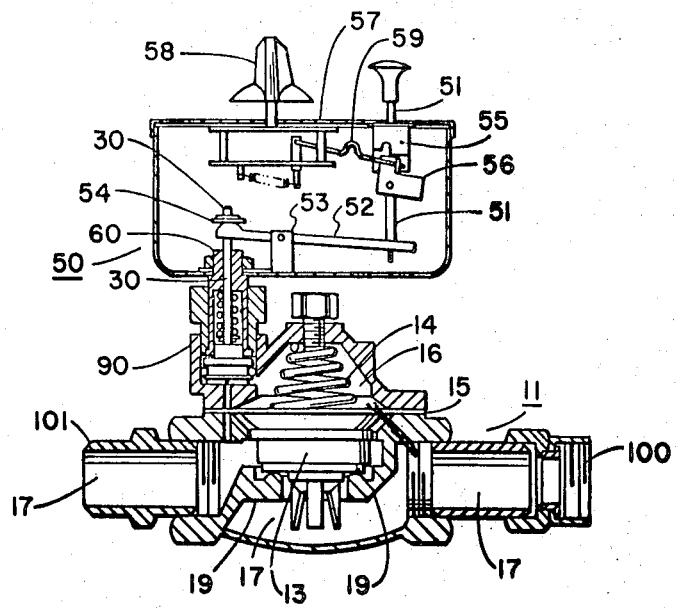
FIG. 3 is a sectional view of the apparatus of FIG. 2 taken through Line 3—3.
Figure 4:
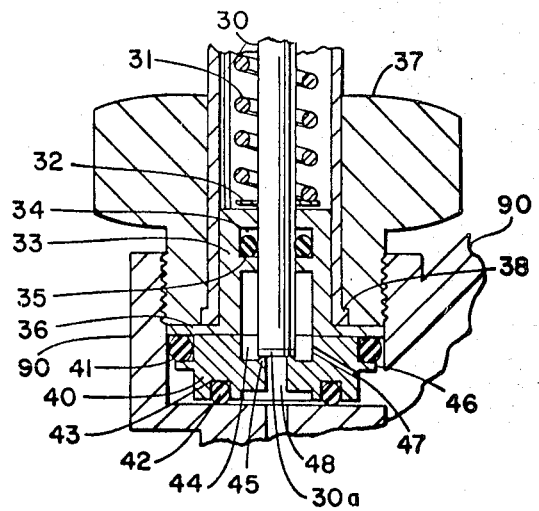
FIG. 4 is a fragmentary sectional view of the automatic valve and valve control interface.

Referring to FIG. 1, there is shown a conventional automatic valve 11 in conjunction with a valve timer and control 50. Shown in greater detail in FIG. 3, the automatic valve includes a float 13 which is free to move vertically against the downward pressure of the spring 14. Also included is a diaphragm 15 which isolates the spring chamber 16 from the primary path 17 of fluid flow. When the valve is closed fluid pressure on both sides of the diaphragm is equalized by capillary 17a interconnecting the primary channel 17 and the spring chamber 16. The valve is controlled by regulating the pressure in the spring chamber 16 to cause the float 13 to move vertically. As shown in FIGS. 3 and 4, when the gating piston 30 is raised, fluid escapes chamber 16 through the then unblocked path in the insert 40; consequently decreasing the pressure in the spring chamber 16. With the pressure then greater in the primary fluid channel 17, the pressure differential forces the float 13 vertically upward from its seat 19 and against the diaphragm and spring pressure, thereby opening the valve and allowing fluid to flow. Lowering the piston 30 closes the bypass through the insert 40 and fluid pressure equalizes on opposite sides of the diaphragm 15. Spring pressure then forces the float down against the seat, closing the valve.

In the conventional apparatus, an electric solenoid actuates the gating piston 30 which in turn actuates the valve. The solenoid, when turned on, moves the piston 30 upward against the resisting force of a spring 31. Turning the solenoid off allows the spring 31 to force the piston 30 downward, thereby closing off the bypass. Also in the conventional apparatus, the closeable bypass is constructed with a removable insert 40 which provides a portion of the fluid escape path and provides the point at which the escape path is opened or closed. The removeable insert seals off undesired paths of fluid flow by means of O-rings 41 and 42. The conventional or usual insert (as shown in FIG. 4) is constructed such that the gating piston 30, when closed, seals off the fluid exit path.

In accordance with the present invention, the preferred embodiment of which is shown in FIGS. 1, 2, 3 and 5, a valve timer and control 50 is conjoined with a standard commercial automatic valve 11 and a uniquely constructed fluid bypass insert or pressure control channel 70.

The valve timer and control 50 includes a plunger 51 pivotally connected to one end of a lever 52 which is pivoted at a fulcrum 53. Coupled to the opposite end of the lever 52 is the upper end of the gating piston 30.

The preferred method of coupling lever to piston is shown in FIG. 3 and includes vertically journaling the piston shaft through a hole in the end of the lever, the shaft being retained in the hole by a transverse stop or cap 54, such as a cotter pin and washer. The part of the lever end which contacts the cap 54 is rounded to facilitate relative movement of the two surfaces as the lever pivots about its fulcrum. Other suitable methods of coupling will be apparent to those skilled in the art.

The plunger 51 is also connected to a cocking device which includes a female socket 55 and a male counterbalanced shaft 56. The male portion is essentially L-shaped and is pivotally connected to the plunger approximately at the bend in the L. The female socket 55 is fixedly mounted to the valve timer control encasement 57 and can receive one leg of the male L. The cavity portion of the socket has two different side by side levels or depths and is constructed such that the male shaft portion is capable of reaching either level. As shown in FIG. 3, one end of the male L-portion is connected to a case mounted timer 58 by a connecting rod 59. Although FIG. 3 shows the invention employing a commercially available mechanical timer 58, it is to be understood that other suitable timing devices, such as battery operated or hydraulic clocks may be used.

A hollow cylindrical housing 60 fixedly mounts to and projects from the timer case 57. The cylinder, within its cavity, encloses and guides the gating piston 30 and also encloses the piston encircling spring 31 against which the piston works. The spring 31 is retained on the piston shaft by a transverse stop 32 such as a cotter pin. An additional guide 33 for the piston 30 mounts in the protruding end of the cylinder 60 and receives the piston 30 through a vertical hole cut concentrically through the cylindrical guide 33. The guide 33 also has an internal channel 34 concentric to and opening into its center hole. The channel 34 receives an O-ring 35 to provide a fluid seal between housing and the piston shaft. The guide 33 has a circular flange 36 at one end.

Figure 5:
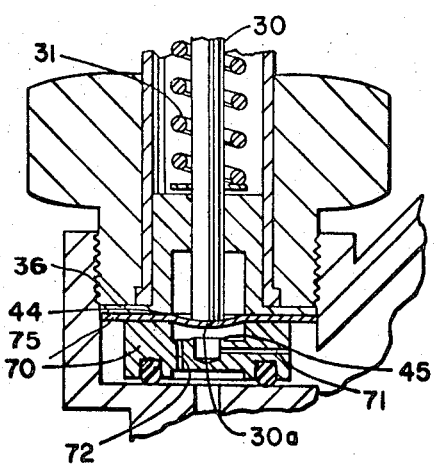
FIG. 5 is a fragmentary sectional view of the automatic valve and control interface including an alternate embodiment of the control disc.

The preferred method of joining the valve control apparatus with the automatic valve is shown in FIGS. 3, 4 and 5. An externally threaded hollow adapter 37, resembling a large bolt having a concentrically drilled hole, receives the cylinder 60 and also threadedly engages the appropriate automatic valve receptacle or control chamber 90. A small shoulder 38 on the end of the cylinder 60, with a matching countersink in the threaded adapter 37, interlocks the cylinder and adapter. Other appropriate methods of interjoining or assembling will be apparent to those skilled in the art.

In the automatic valve control chamber 90 and lying beneath the cylinder 60 and adapter 37 combination is a uniquely constructed fluid bypass insert or pressure control channel 70. Illustrated in detail in FIG. 4, a conventional insert 40 is essentially a short cylindrical section which has a circular flange 46 suitable to support and retain a sealant O-ring 41. The bottom end-surface of the insert has a concentric depression or trough 43 which receives and seats an O-ring 42. The upper end-surface of the insert has a hollow cylindrical cavity 44. The center of the cavity is slightly elevated with respect to the deepest part of the cavity thereby forming a protuberance or a boss 45. The insert rests at the bottom of the automatic valve control chamber 90 pressed and held into place by the guide flange 36 and the adapter 37. An O-ring 41 between guide flange 36 and insert 40 provides a fluid seal.

The conventional insert 40 has a channel opening or fluid entrance path 47 which extends from the side of the insert 40 to a side of the cavity 44. The usual insert also has a fluid exit path 48 which extends from the boss 45 to the center of the bottom end-surface of the insert 40.

In accordance with the present invention and as illustrated in FIG. 5 the insert 70 internal network of fluid passages has been rearranged. The external configuration of the new insert 70 is essentially the same as the conventional insert 40. However, in the new insert 70, the fluid entrance path 71 extends from the side of the insert 70 to the boss 45, and the fluid exit path 72 extends from a side of the cavity 44 to the center of the bottom end-surface of the insert 70. In conjunction with the new insert, an alternate method of preventing leaks from the bypass flow channel may be used. The sealing function of O-ring 41 and O-ring 35 may be achieved by inserting a flexible diaphragm 75 between guide flange 36 and the upper end surface of the insert 70. The diameter of the diaphragm should roughly equal the inside diameter of the automatic valve control chamber 90.

In operation and use, the automatic valve is inserted into and connected to a fluid conveying line by male connector 100 and female connector 101. The automatic valve is buried along with the pipelines. The timer 58, plunger 51 and other apparatus within the case 57 remain above ground or in buried boxes accessible from ground level. The gating piston 30, its housing 60 and other relevant hardware are of appropriate length to connect the above and below ground components.

In the normally off condition the plunger 51 is in an up position and the gating piston 30 is forced down on the insert boss 45 by the piston encircling spring 31 to close off the insert 70 bypass network. A flexible tip 30a on the piston end accomplishes the requisite seal. FIG. 4 illustrates the piston 30 and boss 45 relationship during the normally off condition.

To activate the device, the timer 58 is rotatably set to the desired period of time and the plunger 51 is manually depressed. When the plunger 51 is depressed, the counterbalanced male L-portion 56 of the cocking mechanism rotates on its pivot due to gravitational force and seats or catches on the ledge or shallower level of the female socket portion 55 of the cocking device. In this position and with manual plunger force relaxed the plunger is cocked due to the tendency of the compressed piston encircling spring 31 to transmit through the lever 52 an upward force on the plunger 51 which in turn wedges the male L-portion 56 onto the shallower level of the female socket 55. The plunger cannot return until the male L-portion is rotated back to a position where it can re-enter the deeper level of the female socket.

As the plunger moves down it causes the lever 52 to pivot, consequently forcing the spring piston 30 up against the downward force of the piston encircling spring 31.

With the piston tip 30a no longer in contact with the boss 45 and with the cocking device supporting the cocked piston position, fluid is free to flow through the insert 70 internal channel network. FIG. 5 illustrates the piston 30 and boss 45 relationship during the operating or flow condition. Fluid flows in from the chamber 16 to insert 70 through the fluid entrance path 71 and enters the cavity 44 at the boss 45. The fluid then flows from the cavity 44 through the fluid exit path to the hole 72 in the bottom end surface of the insert 70. At this point the automatic valve functions in its conventional manner. Pressure decreases in spring chamber 16 and the greater fluid pressure in the primary fluid channel 17 forces the float 13 upward off its seat 19 and against the downward force of the spring 14 and diaphragm 15, thereby opening the primary fluid channel 17.

The fluid flow through the primary fluid channel 17 continues until the originally set period of time expires. At zero time remaining, the timer 58 pulls the connecting rod 59 laterally so as to trip the cocking device. The male L-portion 56 rotates to the requisite position for entering the female socket 55 deeper level. No longer cocked, the piston encircling spring 31 simultaneously forces the piston 30 down and acting through the lever 52, forces the plunger 51 up. The piston tip 30a closes off the fluid entering the insert cavity 44, thereby equalizing pressure on opposite sides of the diaphragm 15 and causing the spring 14 in the upper chamber 16 to re-seat the float 13 and cut off the fluid flow.

Usually the automatic valve, along with its conventional electric solenoid control and the electric power cables are buried underground. The automatic valve is controlled remotely by electric switching. Quite frequently, automatic valve cutoff failures occur due to small particles in fluids fouling the gating piston tip 30a and the hole in the boss 45. These particles build up and prevent a sure and complete cut-off of fluid flow through the fluid bypass insert 40. In turn this prevents cut-off of fluid flow through the fluid bypass insert 40. In turn this prevents cut-off of the primary fluid channel 16, irrespective of any electrical input signal. When such a failure occurs, a main fluid valve must be shut down and the defective automatic valve must be located, dug out of the ground, then cleaned, repaired or replaced. Electrical control wires can also break, short or deteriorate due to environmental conditions, thereby causing turn-on failures. The wires must be dug up and repaired. Locating the point of electrical control cable failure can be very difficult and sometimes requires excavation, removal and/or repair of the entire cable. Obviously, maintenance of the conventional system is very time consuming, expensive and inconvenient. The above described failures require a great deal of money, effort and labor to be expended. For instance, such a failure of a golf course watering system not only requires watering system repair but golf course repair.

In contrast, the present invention provides extraordinary reliability since no wiring is required and assures a positive cut-off after every timed flow cycle has expired. The use of nothing but mechanical control and timing devices contributes to these results.

Since the automatic valve is activated by manual depression of the plunger 51, which in turn raises the gating piston 30, a stronger piston closing spring 31 may be used than when a reasonable electric solenoid is relied on to raise the piston. Use of the stronger spring makes possible a more reliable and positive seal between the piston tip 30a and the cavity boss 45. The increase in predictability and positive sealing in turn helps assure fluid cut-off every time.

A further significant feature is that use of the stronger spring also permits the new bypass insert to be employed. In the conventional system, which uses the standard bypass insert 40, the gating piston 30, in the no-flow condition, seals off the fluid exiting the cavity 44. Less piston closing spring 31 force is required to do this than if the seal were made against the incoming flow and pressure; but a natural tendency of a fluid drain or container exit hole is to accumulate the sedimentary particles present in the fluid. Consequently the boss 45 collects grit and obstructs a positive seal of the piston tip 30a.

In accordance with the present invention, use of a stronger piston closing spring 31 permits the cut-off seal to be made against the incoming flow and pressure. As described earlier, the internal passage network of the new bypass insert 70 feeds the fluid from the side of the insert directly to the boss 45. The cut-off sealing contact of diaphragm 75 and boss 45 is made with the piston acting against incoming flow pressure. Sediment and particles do not collect around the fluid input port as they do around the fluid drain hole.

The fluid entrance opening stays clean and unobstructed. Since no fouling grit accumulates, the diaphragm 75 can make a clean and complete contact with the boss 45. Thusly, close off against the fluid entrance (ultimately made possible and practical by use of altogether mechanical devices, more powerful springs and the unique insert) is a further major factor contributing to the extraordinary reliability and results achieved by the present invention. Moreover, use of the unique bypass insert and the stronger piston closing spring permits the earlier described alternate diaphragm method of piston 30 and cavity 44 sealing to be used.

As illustrated in FIG. 4, O-ring 35 prevents fluid from entering the cylindrical housing 60 wherein the piston closing spring 31 is enclosed and retained. O-ring 41 prevents fluid from escaping between the guide flange 36 and the upper end surface of the bypass insert 70. In accordance with FIG. 5 flexible diaphragm 75 is positioned between the guide flange 36 and the upper end surface of the insert 70. The diaphragm 75 is thus between the boss 45 and the tip of piston 30. The piston 30 action is the same and in the normally off position depresses or stretches the diaphragm 75 downward against the boss 45. In the flow position, the piston is up, the diaphragm 75 is relaxed and the hole in the boss 45 is open. Although a diaphragm placed between guide flange 36 and the insert upper surface obviates the need for sealant O-rings 35 and 41, operational difficulties arise when the diaphragm is employed in conjunction with the conventional bypass insert 40. In operation with the usual insert, fluid pressure constantly forces against the diaphragm due to the piston acting to seal off the fluid exit path. The input, not being closed off, provides a continuous path for the fluid pressure to constantly stretch and upwardly expand the sealing diaphragm. To close the bypass and keep it closed requires a large and continuous downward force by the piston closing spring. Achieving the requisite continuous force is not practicable when using a reasonable electric solenoid control.

In contrast, by sealing and closing off the fluid entrance path, as in the invention described herein, the excess fluid in the cavity 44 can drain off through the unsealed exit after the piston has stemmed the input. Consequently the diaphragm relaxes and once the excess fluid drains off the force required to keep the bypass closed is less than if some trapped fluid continued to press upward.

Another feature of the invention and also contributing to overall device reliability, is the clean simplicity of the control mechanism. Moreover the device can readily be adapted to control most automatic valves now made. Also the piston closing spring pressure can be varied to accommodate higher fluid pressures.

For convenience of operation, the system can be operated remotely by means of appropriate adapters and tubing attachments running from the automatic valve 11 to a remote valve timer and control 50. The tubes would carry the fluid from the upper spring chamber 16 of the automatic valve to a mechanically operated and timed piston analogous to that described above. A return fluid path could be provided but would not be necessary since the amount or volume of fluid wasted would be negligible. If needed, and depending on the fluid, the fluid through the control channel or bypass insert could be collected and saved.

While references have been made to specific applications of the present invention, such as golf course watering, the invention encompasses any type of fluid flow wherein highly reliable valve control is desired. It will be apparent to those skilled in the art that the same principles may be applied to control the flow of other fluids such as gases or vapors. Accordingly, it should be understood that although the invention has been described with particular reference to specific embodiments thereof, the forms of the invention shown and described in detail are to be taken as the preferred embodiments of same and that various changes and modifications may be resorted to without departing from the spirit and scope of the invention as defined by the appended claims.

What is claimed is:

1. Apparatus for controlling fluid flow through a valve of the type including a primary channel having an inlet and an outlet, a restricted passageway interposed between the inlet and the outlet of the primary channel, blocking means seatable in the passageway from the outlet side thereof, an expandable fluid chamber coupled to the blocking means and having an inlet and an outlet, the inlet of the expandable chamber being in fluid communication with the inlet of the primary channel to expand the chamber to seat the blocking means in the passageway when the outlet of the expandable chamber is blocked, and to permit compression of the expandable chamber by the fluid in the inlet of the primary channel when the outlet of the fluid chamber is unblocked to unseat the blocking means to permit fluid flow through the passageway, which comprises:

a control chamber having an inlet in fluid communication with the outlet of the expandable chamber and an outlet in fluid communication with the outlet of the primary channel;

an elongated piston slidably disposed axially in said control chamber and moveable between a first position permitting fluid flow through said control chamber and a second position obstructing fluid flow through said control chamber;

means resiliently urging said piston axially into said second position;

a fixed fulcrum;

a lever pivotally mounted on said fulcrum and pivotally connected at one end to said piston;

an elongated plunger pivotally connected at one end to the other end of said lever;

means guiding said plunger for slidable movement axially in a path substantially parallel to the path of said piston, whereby said piston and said plunger are urged in opposite directions through said lever by said resilient means;

a latching member pivotally connected at one end to said plunger;

a selectively actuable, automatic timing device having an element moveable from a predetermined position when said timing device is actuated and returnable to said position when said timing device ceases actuation;

means resiliently coupling said latching member to the element of said timing device to control the pivotal position of said latching member in accordance with the position of said element; and first and second abutment means formed on said plunger guiding means in offset spaced relationship along the path of said plunger away from said lever, said latching means being in a predetermined pivotal position aligned and resiliently urged into abutting engagement with said second abutment means, to permit said piston to be urged into its second position by said resilient means, when said element of said timing device is in its predetermined position and being moveable out of said predetermined pivotal position and aligned and resiliently urged into abutting engagement with said first abutment means, to hold said piston in its first position through said plunger and said lever against the force of said resilient means, when said element of said timing device is moved from its predetermined position.

2. Apparatus as set forth in claim 1 wherein said latching member is counterbalanced to permit it to move out of its predetermined position through gravity when said timing device is actuated and said plunger is moved to move said latching member past said first abutment means against the force of said resilient means.

3. Apparatus as set forth in claim 1, wherein said control chamber includes:

a first cavity in fluid communication with said control chamber outlet for axially receiving said piston;

a second smaller cavity, axially aligned with said first cavity and in fluid communication with said first cavity and said control chamber inlet, closeable by said piston when said piston is in its first position to close said control chamber inlet.

4. Apparatus as set forth in claim 3 wherein said control chamber outlet is parallel to and spaced from said second cavity and said control chamber inlet is transverse to said cavities and said piston.

* * * * *